W. W. MARSTON.
Revolver.
No. 17,386. Patented May 26, 1857.
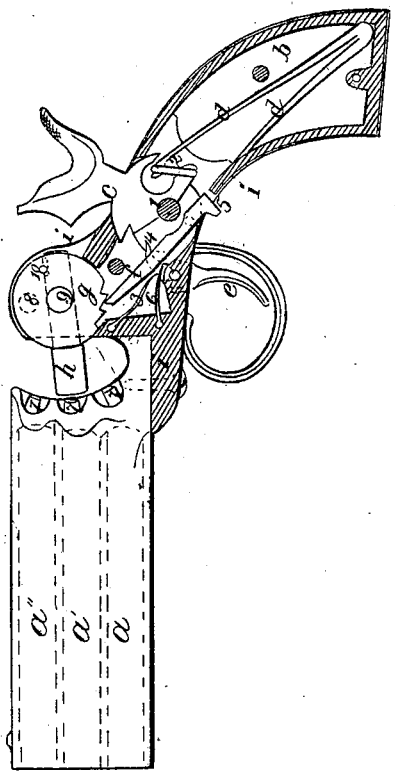

UNITED STATES PATENT OFFICE.

W. W. MARSTON, OF NEW YORK, N. Y.

IMPROVED REPEATING FIRE-ARM.

Specification forming part of Letters Patent No. 17,386, dated May 26, 1857.

*To all whom it may concern:*

Be it known that I, WILLIAM W. MARSTON, of the city, county, and State of New York, have invented, made, and applied to use certain new and useful Improvements in Repeating Fire-Arms; and I do hereby declare that the following is a full, clear, and exact description of the construction and operation of the same, reference being had to the annexed drawings, making a part of this specification, wherein—

Figure 1 is a side elevation of a pistol fitted with my improvements with the cap-plate of the lock removed, and Fig. 2 is a cross-section of the exploding-punch and its cylinder.

Similar marks of reference denote the same parts.

The nature of my said invention consists in the construction and mode of arranging an exploding-punch moving in and by a partially revolving or oscillating cylinder that turns said exploder or punch to coincide successively with the nipples of two, three, or more barrels placed one above the other, so that said barrels are fired by the cocking and discharge of the hammer acting on said exploder. My invention is especially adapted to pistols, because of being compact and adapted to the pocket and setting flat against the person.

In the drawings, $a$ $a'$ $a''$ are the barrels, formed together and connected to the handle $b$ by the metallic straps $i$.

$c$ is the hammer on the center-pin 1.

$d$ is the mainspring, and 2 the swivel, as usual.

$e$ is the trigger, and 3 the trigger-spring; 4, the notches or bents of the tumbler taking the trigger.

$f$ is a dog countersunk in the side of the hammer-tumbler, and moved with said tumbler by a pin in the same, as shown in dotted lines.

5 is the rear end of said dog, projecting slightly through a slot in the strap $i$; and 6 is a spring keeping the forward end of the dog $f$ toward the cylinder $g$. This cylinder $g$ is set to turn or oscillate on trunnions 9, and carries through it the exploder $h$, to which a small amount of endwise motion is allowed by a pin, 10, passing into or against a notch or mortise in the exploder $h$, and the cylinder $g$ is prevented from shaking about or becoming loose by means of a friction-spring, 8, (see Fig. 2,) acting against one side of the strap $i$.

The operation is as follows: The barrels $a$ $a'$ $a''$ are to be loaded in any usual manner and the hammer $c$ half-cocked. The caps are to be placed on the nipples 7, and for this purpose the dog $f$ is to be disengaged from its notches on the cylinder $g$ by pressing in the end 5, so that the said cylinder $g$ and its exploder $h$ can be moved up or down; and when the caps are in place said exploder $h$ is pressed down to the line of or slightly below the first nipple. The hammer is then lowered so as to rest on the exploder $h$, or the cocking is completed ready for firing the barrel $a$, the act of doing which insures the exploder $h$ being properly placed to take the first nipple 7, because the dog $f$ is projected and turns the cylinder $g$ by its notches to the correct point; and when the hammer is discharged the same strikes the exploder $h$, firing the piece. On again cocking the piece the dog $f$ turns the cylinder $g$ to bring the exploder $h$ onto the line of the second nipple, and so on to the successive barrels.

The point of the exploder $h$ is rounded off to prevent catching in the caps as it moves.

It will be thus seen that my apparatus is very simple, cheap, durable, and efficient, and that the fire-arm fitted with the same is very compact and can be made thin and flat, in a form adapted to be carried on the person.

To prevent pieces of the caps from flying off when said caps are exploded, a small shield may be formed on one side of the exploder $h$ against that side of the nipple-recess which is removed for the insertion and removal of the caps.

What I claim, and desire to secure by Letters Patent, is—

The combination of the exploder $h$ and cylinder $g$, actuated by the dog $f$, or its equivalent, to explode successively the barrels arranged vertically over each other, substantially as specified.

In witness whereof I have hereunto set my signature this 6th day of May, 1857.

W. W. MARSTON.

Witnesses:
 LEMUEL W. SERRELL,
 THOMAS G. HAROLD.